(12) United States Patent
Auwärter et al.

(10) Patent No.: US 7,762,420 B2
(45) Date of Patent: Jul. 27, 2010

(54) PRESSURE COOKER

(75) Inventors: Wolfgang Auwärter, Rikon im Tösstal (CH); Marc Huber, Turbenthal (CH)

(73) Assignee: Kuhn Rikon AG (CH)

( * ) Notice: Subject to any disclaimer, the term of this patent is extended or adjusted under 35 U.S.C. 154(b) by 767 days.

(21) Appl. No.: 11/588,940

(22) Filed: Oct. 27, 2006

(65) Prior Publication Data

US 2007/0095836 A1    May 3, 2007

(30) Foreign Application Priority Data

Oct. 28, 2005    (EP) .................................. 05405612

(51) Int. Cl.
  *B65D 45/00*    (2006.01)
  *B65D 51/16*    (2006.01)
(52) U.S. Cl. ...................... 220/316; 220/293; 220/303; 220/912
(58) Field of Classification Search .................. 220/293, 220/303, 316, 324, 788, 912
See application file for complete search history.

(56) References Cited

U.S. PATENT DOCUMENTS

| 4,396,130 | A | * | 8/1983 | Robinson | 220/316 |
| 4,620,643 | A | * | 11/1986 | Sebillotte | 220/316 |
| 4,932,550 | A | * | 6/1990 | Moucha | 220/203.09 |
| 5,135,121 | A | * | 8/1992 | Javier | 220/203.07 |
| 6,105,808 | A | * | 8/2000 | Mendonca | 220/316 |
| 6,135,013 | A | * | 10/2000 | Barrena | 99/337 |
| 6,523,459 | B1 | * | 2/2003 | Chameroy et al. | 99/337 |
| 6,705,209 | B2 | * | 3/2004 | Yang et al. | 99/337 |

* cited by examiner

*Primary Examiner*—Anthony Stashick
*Assistant Examiner*—Madison L Wright
(74) *Attorney, Agent, or Firm*—Wood, Phillips, Katz, Clark & Mortimer

(57) ABSTRACT

The pressure cooker has a pot (2) with a base and a side wall and an upper rim (6). A lid (3) can be connected to the pot (2) in a sealed manner along the abovementioned upper rim (6). In the presence of a predetermined positive pressure, a locking device (12) connects the lid (3) to the pot in a non-releasable manner in conjunction with a pressure element (11) arranged on the lid (3). The locking device (12), in a fitting (5) of the lid (3), has a rocker (12a) which is mounted in a movable manner and, for control purposes and in order to lock the lid (3), interacts with the pot (2) and the abovementioned pressure element (11). Locking takes place automatically when the pressure cooker is closed and the locking means can be produced in a reliable and cost-effective manner.

17 Claims, 7 Drawing Sheets

PRESSURE COOKER

BACKGROUND OF THE INVENTION

1. Field of the Invention

The invention relates to a pressure cooker which has a pot with a base and a side wall and an upper rim, having a lid which can be connected to the pot in a sealed manner along the abovementioned upper rim, and having a locking device which, in the presence of a predetermined positive pressure, connects the lid to the pot in a non-releasable manner in conjunction with a pressure element arranged on the lid.

2. Background Art

Pressure cookers of this type have been known for a long time now. The pressure in the interior of the pressure cooker can be increased by the base of the pot being heated, so that the cooking process is accelerated. The lid is usually connected to the pot by means of the bayonet connection. The lid can be released from the pot by being pivoted. The locking device prevents the situation where the lid can be rotated, and thus released from the pot, in the presence of a significant positive pressure. The prior art has disclosed numerous such locking devices. These have, on the lid, a pressure element which, for example in the presence of a positive pressure, has a projecting stub or pin which interacts with a displaceable catch for locking purposes.

A pressure cooker of the type mentioned is disclosed, for example, in EP 0 123 197 A. This pressure cooker has, in a lid handle, a locking closure designed as a snap-fitting closure. The locking closure is intended to prevent the lid from being rotated unintentionally in relation to the pot. The lid handle here is connected to the lid in a releasable manner.

DE 27 05 712 A discloses a lid-locking and pressure-relief means on a steam pressure cooker. Locking takes place by way of a protuberance which, for unlocking purposes, can be displaced by way of an actuating knob which projects on the top side of a lid handle. During unlocking, a valve is opened at the same time and pressure is thus dissipated.

DE 203 18 647 U relates to a (steam) pressure cooker. The latter has two locking means, which means that production involves comparatively high outlay.

SUMMARY OF THE INVENTION

The object of the invention is to provide a pressure cooker of the abovementioned type which is distinguished by a more straightforward and cost-effective locking means. Nevertheless, it is intended for the locking means to be functionally reliable and straightforward to handle.

The object is achieved, in the case of a pressure cooker of the generic type, in that the locking device, in a fitting of the lid, has a rocker which is mounted in a movable manner and, for control purposes and in order to lock the lid, interacts with the pot and the abovementioned pressure element. Such a locking means may be designed with just a small number of parts and in a very space-saving manner. The rocker can be accommodated, for example, in a lid handle, it being possible for the lid handle to be of comparative narrow design. Locking takes place automatically, as does unlocking. Manipulation is thus neither possible nor necessary in order to release the locking means.

According to a development of the invention, it is provided that, when the lid is rotated, the rocker is controlled by a contour of the abovementioned rim. This has the significant advantage that there is no need for any additional parts in order to control the rocker.

According to a development of the invention, it is provided that the contour is formed by at least one bayonet. The costs are particularly low when, according to a development of the invention, for the purpose of locking the lid, the rim has a recess, stamped formation or a projecting part which interacts with the rocker. Such recesses and stamped formations can be mass-produced very cost-effectively. This is the case, in particular, when the recess or stamped formation, or the projecting part, is arranged on a bayonet.

According to a development of the invention, the rocker is mounted in an essentially concealed recess of the fitting. This is advantageous, in particular, from an aesthetic point of view. In addition, the rocker is thereby protected against being damaged.

Straight forward and secure mounting of the rocker is ensured when, according to a development of the invention, the rocker has a spindle by which it is mounted in the fitting such that it can be pivoted to a limited extent.

The locking means is particularly functionally reliable when, according to a development of the invention, the rocker has an arm which, in the locked position, is stop-blocked in a movable part of the pressure element. The movable part is, for example, a stub or a pin which, in the presence of a positive pressure in the pressure cooker, projects on the top side of the lid.

According to a development of the invention, it is provided that the rocker has a finger which, for the purpose of controlling the rocker when the lid is rotated, follows along a contour of the pot. This allows a particularly straightforward construction of the locking device. This is the case in particular when, according to a development of the invention, in the locked position, the finger engages with a bayonet. The invention allows, in particular, a symmetrical arrangement, so that the lid can be connected to the pot, for example, in two or three different positions. For example, it is possible for two or three bayonets to be arranged symmetrically and provided for the locking means. A significant advantage of the invention is also seen in the fact that the pressure cooker is hardly any different from a conventional pressure cooker. In particular, the pot may be produced such that it is essentially hardly any different from a pot without any locking means.

Particularly cost-effective production is achieved when the rocker is produced in one piece. It is also possible, however, for the rocker to be produced from a number of parts which are connected to one another in an articulated manner.

According to a development of the invention, the rocker is designed such that, when the lid is not fully closed, it deforms a sealing ring mounted in the lid, so that it is not possible for any pressure to be built up in the pressure cooker.

BRIEF DESCRIPTION OF THE DRAWINGS

Exemplary embodiments of the invention are explained in more detail hereinbelow with reference to the drawings, in which.

DETAILED DESCRIPTION OF THE INVENTION

Figure 2:
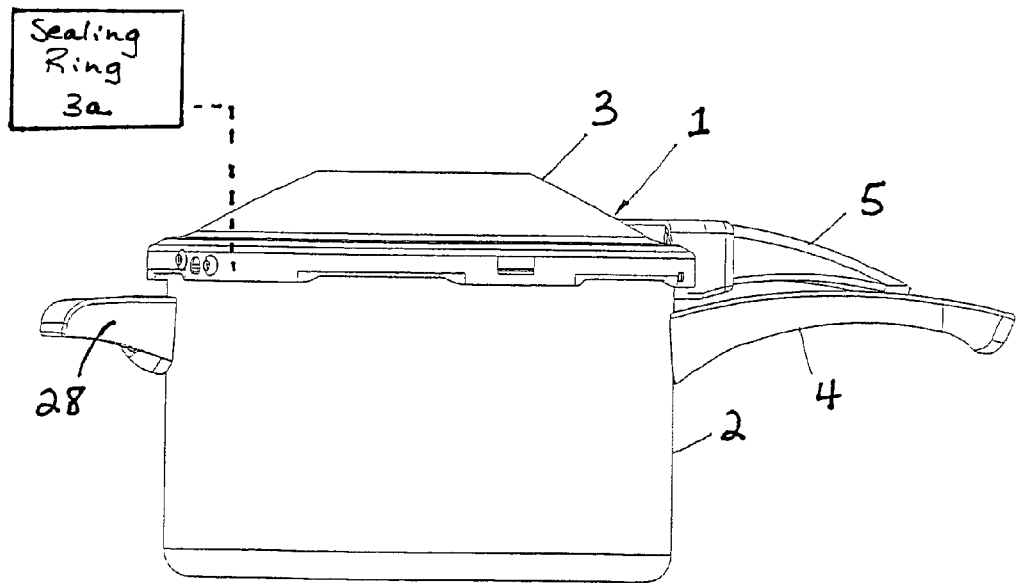
FIG. 2 shows a lateral view of the pressure cooker according to the invention.
Figure 7:
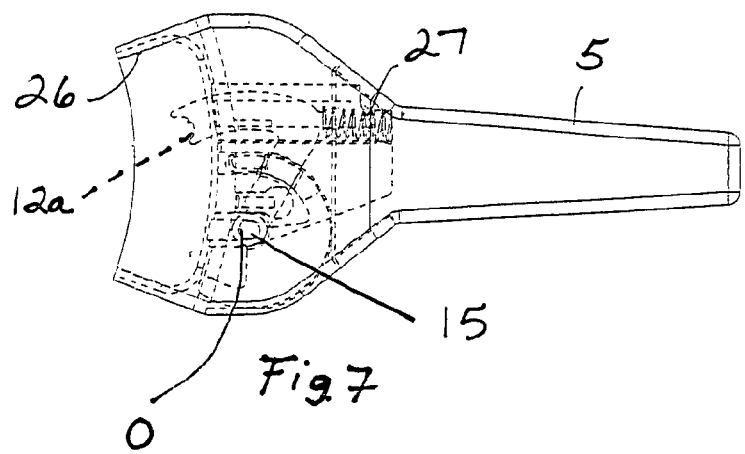
FIG. 7 shows a view of a lid handle with a rocker mounted therein, the rocker being depicted by dashed lines.
Figure 8:
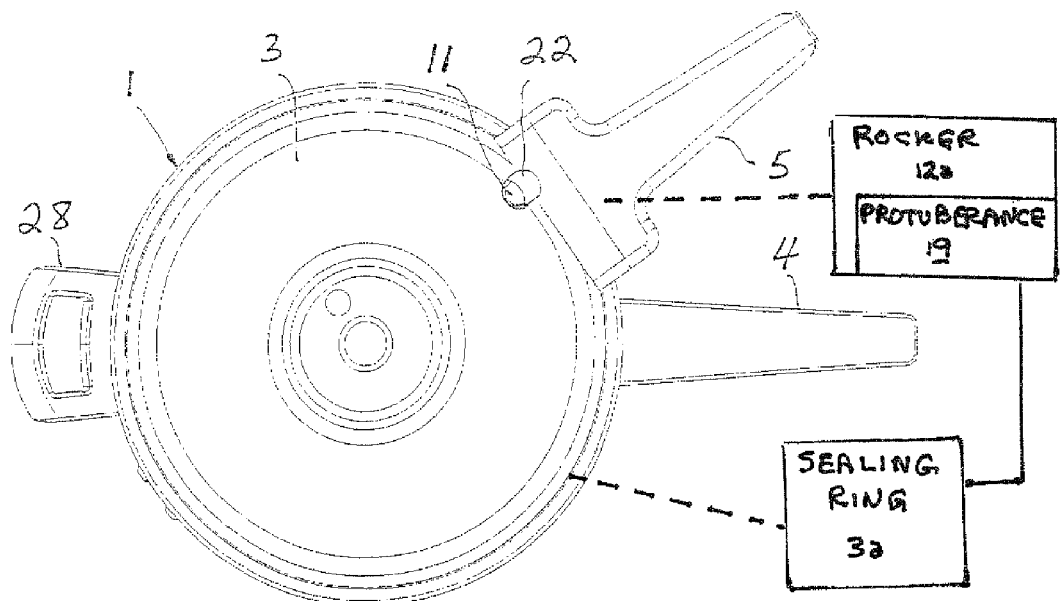
FIG. 8 shows a plan view of the pressure cooker according to the invention, the lid being shown in the unlocked position.

The pressure cooker 1 which is shown in FIGS. 2 and 8 has, in an in fact conventional manner, a pot 2 which has a base with a side wall 9 that is open at the top and also a lid 3, by means of which the pot 2 can be closed in a sealed manner. The pot 2 is provided in a known manner with fittings, in particular with a pot handle 4, which in this case is designed as an elongate handle and a spaced handle 28. It is also possible, however, for the pot handle 4 to be designed in some other way, as is known per se. The lid 3 likewise has fittings, in particular a lid handle 5, shown also in FIG. 7, which is likewise an elongate handle and which, when the pressure cooker 1 is closed, is located above the pot handle 4.

The lid handle 5 is thus fixed to the lid 3 and, in particular, is screwed thereto. In order to close the pressure cooker 1, the lid 3 is positioned on the pot 2 and rotated relative to the pot 2 until the lid handle 5 is located above the pot handle 4. FIG. 8 shows the lid 3 in the unlocked position, the lid handle 5 thus having been rotated in relation to the pot handle 4.

Figure 1:
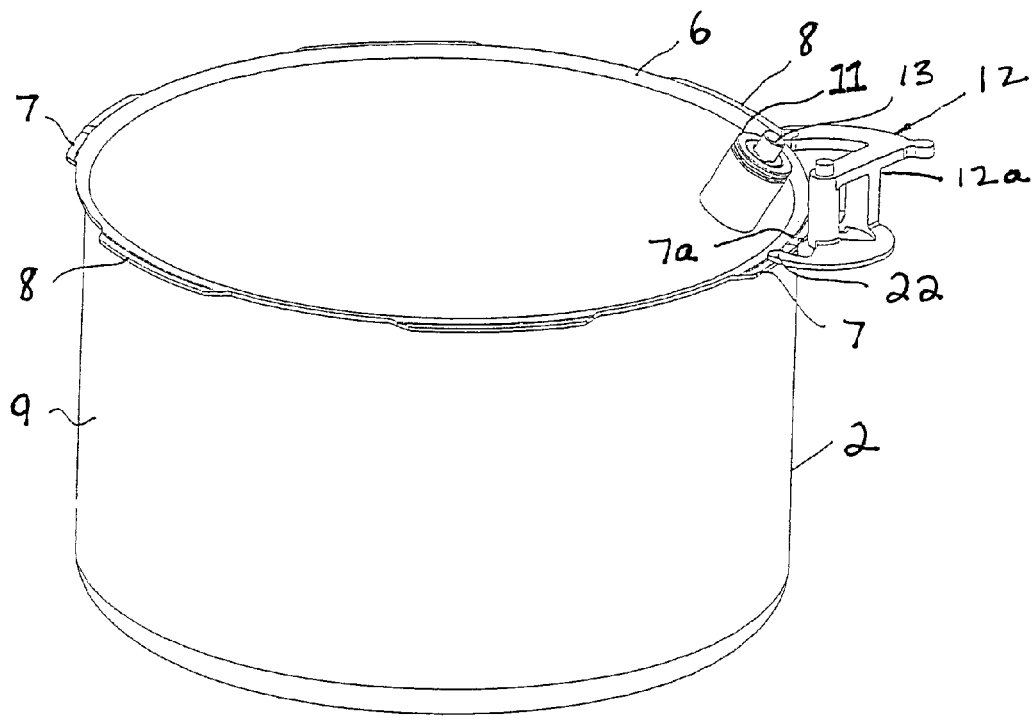
FIG. 1 shows a three-dimensional view of a pressure cooker according to the invention, the lid having been removed.
Figure 3:
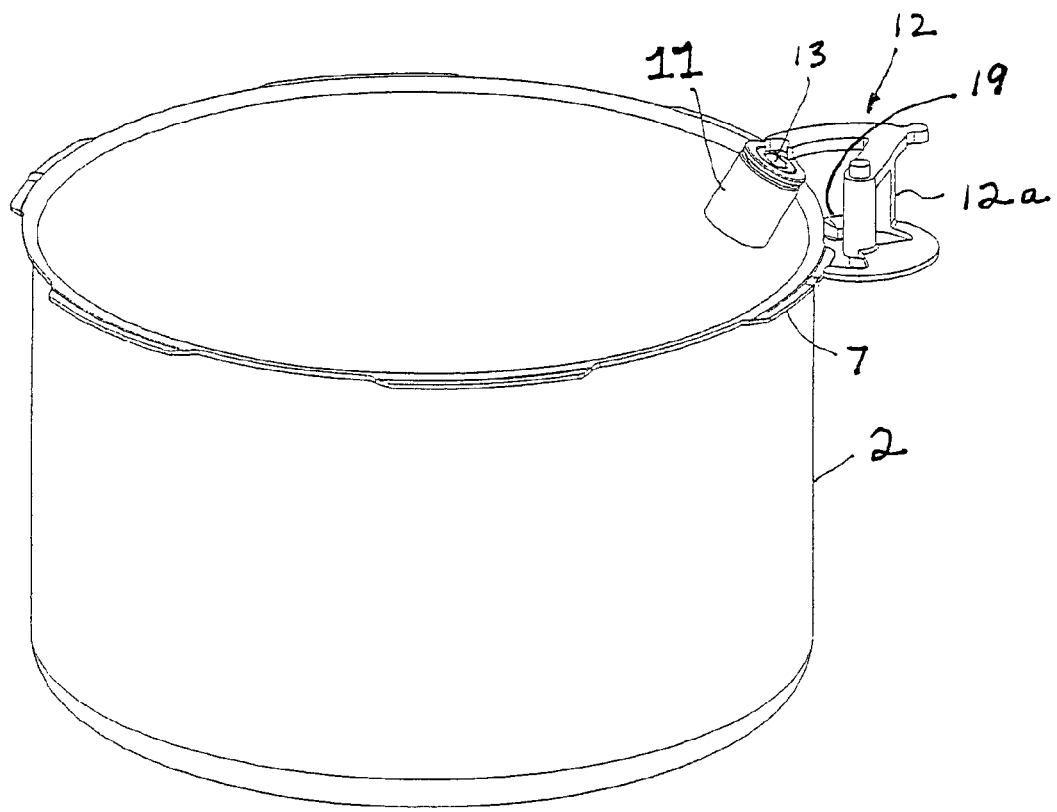
FIG. 3 shows a further view of the pressure cooker according to the invention, in which case, for illustrative reasons, the lid has also been removed.

The connection between the pot 2 and the lid 3 is a bayonet connection, a plurality of bayonets 7 and 8 being arranged on the pot 2 according to FIGS. 1 and 3 and, correspondingly, bayonets likewise being arranged in a known manner on the lid 3. FIG. 8 shows the lid 3 in the position in which it can be removed from the pot 2. The pressure cooker 1 is closed by the lid 3 being rotated in a clockwise direction until the lid handle 5 is located above the pot handle 4 to thereby lock the lid 3. For opening purposes, the lid 3 is rotated through the same angle in the counterclockwise direction.

Figure 9:
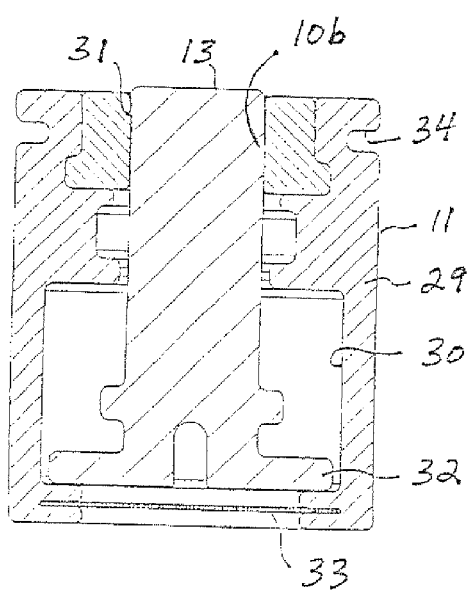
FIG. 9 shows a section through a pressure element.
Figure 10A:
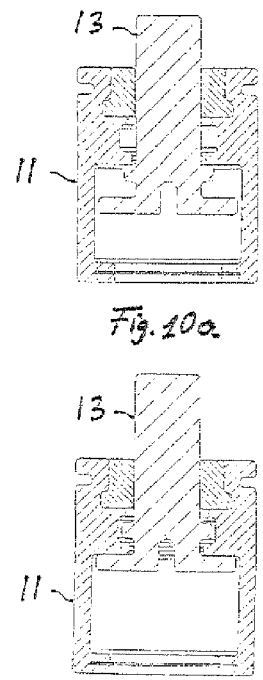
FIG. 10a shows the pressure element according to FIG. 9, but in the blocking position.
Figure 10B:
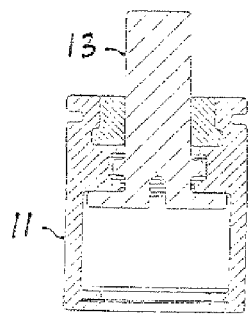
FIG. 10b shows the pressure element in the overloaded position, in which, in the presence of positive pressure in the pressure cooker, steam is let out.

Arranged on the lid 3 is a pressure element 11 which has a movable pin 13 and, at the same time, is a safety element which lets off steam in the presence of a predetermined positive pressure, in the position which is shown in FIG. 10b. As seen in FIGS. 9, 10a and 10b, this pin 13 is mounted such that it can be displaced in a bore 31 of a guide element 10b and a recess 30. The pressure element 11 has a sleeve-like and elastomeric housing 29 with a groove 34 in which engages a periphery of a bore of the lid 3, so that the pressure element 11 is fixed securely on the lid 3. The recess 30 is protected against soiling in relation to the interior of the pressure cooker 1 by means of a screen 33. The screen 33 is flexible. If there is no positive pressure prevailing in the interior of the pressure cooker 1, then the pin 13 is located in the position which is shown in FIG. 9. If there is an increase in the pressure in the interior of the pressure cooker 1, then the pin 13 is raised and, finally, projects beyond the housing 29 by way of its front end, as is shown in FIG. 10a. If there is a further increase in the pressure in the interior of the pressure cooker 1, then, ultimately, the pin 13 moves into the position which is shown in FIG. 10b, in which a collar 32 blocks further movement and pressure is dissipated.

The pressure element 11 thus forms, at the same time, a safety valve which prevents an inadmissible pressure from being established in the pressure cooker 1.

Figure 4:
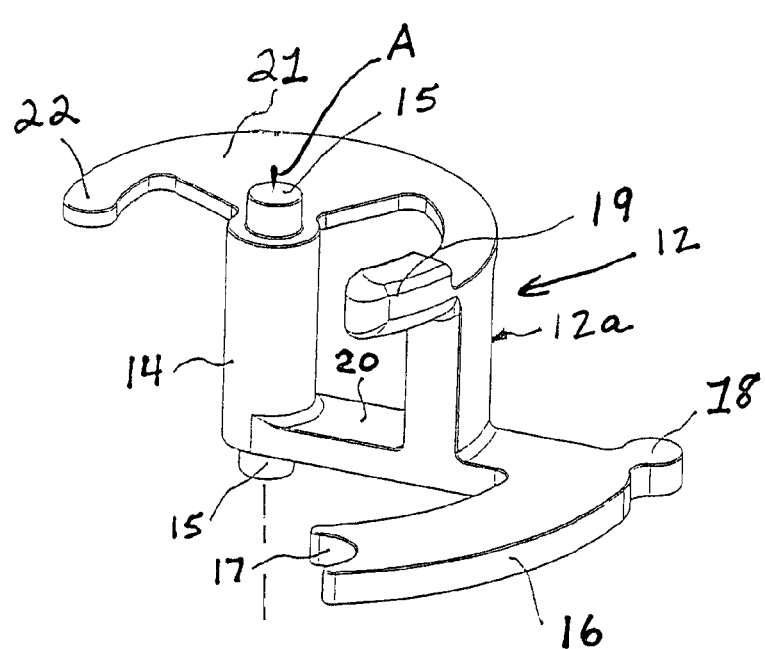
FIG. 4 shows a three-dimensional view of the rocker.

The pressure element 11 interacts with a locking device 12, as shown in FIGS. 1, 3 and 4. This locking device 12 and the pressure element 11 are intended to prevent the possibility of the lid 3 being opened in the event of a positive pressure prevailing in the interior of the pressure cooker 1. It is thus intended to achieve the situation where the lid 3 cannot be rotated in the presence of a positive pressure.

Opening is also to be reliably prevented in the presence of a comparatively small positive pressure of, for example, from 0.04 or 0.05 bar. Blocking is to take place automatically, so that it is ensured that opening is ruled out when the pressure cooker 1 is closed and positive pressure prevails.

The locking device 12 has a rocker 12a which is preferably, but not necessarily, in one piece and produced from plastic. According to FIG. 7, the rocker 12a is mounted in a pivotable manner in a recess 26 of the lid handle 5. For mounting purposes, the rocker 12a, according to FIG. 4, has a spindle 14 with two journals 15, which engage in corresponding openings O (one shown here) in the interior of the recess 26 of the lid handle 5, to guide pivoting movement of the rocker 12a relative to the lid handle 5 around an axis A. Located in the recess 26, at a distance from the spindle 14, is a spring element 27, in particular a helical spring, which is connected to the rocker 12a at a protuberance 18. It is also possible for the spring element 27 to act on any other location of the rocker 12a and to be designed, for example, as a leaf spring.

The protuberance 18 is located on an arm 16 which projects radially from the spindle 14 and, at a distance from the protuberance 18, has a recess 17 which, in the locked position according to FIG. 1, interacts with the pin 13. The arm 16 is fixed to the spindle 14 via a crosspiece 20. The rocker 12a may be produced from plastic or a suitable metal.

Extending parallel to the arm 16 is a wall 21, on which a finger 22 is integrally formed. This finger 22 interacts with a rim 6 of the pot 2 and, in particular, with a bayonet 7. Spaced apart from the finger 22 is a protuberance 19 which, as can be seen, is somewhat thicker than the wall 21. The wall 21 is mounted such that it can be pivoted around the axis A to a limited extent by way of the protuberance 19 in the recess 26. The protuberance 19 serves for controlling the rocker 12a and is positioned such that it slides along the rim 6 when the lid 3 is rotated. As long as the lid 3 is not completely closed, the protuberance 19 acts on a conventional sealing ring 3a mounted in the lid 3, and deforms the latter, so that it is not possible for any pressure to be built up in the pressure cooker. This ensures a further safety function.

In respect of the bayonet 7 which is shown in FIG. 3, the protuberance 19 is arranged such that, in the case of the lid 3 being positioned according to FIG. 8, the protuberance is located in front of a bayonet 7, as is shown in FIG. 3. If the lid 3 is rotated in the clockwise direction from the position which is shown in FIG. 8, then the protuberance 19 moves onto the bayonet 7 and slides along the same. The protuberance 19 is deflected in the radial direction by the bayonet 7 and, correspondingly, the rocker 12a is rotated about the axis A of the spindle 14. The finger 22 is pivoted, at the same time, by this rotary movement, to be precise such that it is moved radially inward. The protuberance 19 thus moves outward and the finger 22 moves inward. If the lid 3 is in the closed position, then the protuberance 19 butts against the outside of the bayonet 7 and the finger 22, according to FIG. 1, engages in the region of the bayonet 7. If there is no positive pressure in the pressure cooker 1, then it is possible for the lid 3 to be rotated once again into the position which is shown in FIG. 8, and for the pressure cooker 1 to be opened. The rocker 12a here moves correspondingly in the opposite direction about the spindle 14. This movement is assisted by the biased spring 27. If a positive pressure then prevails in the interior of the pressure cooker 1, this movement in the opposite direction is no longer possible. In the presence of positive pressure, the pin 13, according to FIG. 1, projects on the top side of the lid, to be precise such that it is located directly in front of the recess 17, as is shown in FIG. 1. It is thus no longer possible for the rocker 12a to be pivoted since the arm 16 is positioned against the projecting pin 13 by way of the recess 17.

As has been mentioned above, in the above-cited position according to FIG. 1, the finger 22 engages in the region of the bayonet 7. According to FIG. 1, the bayonet 7 is provided with a stamped formation 7a which deforms the bayonet 7 such that the latter is elevated in the region of the stamped formation. This stamped formation 7a forms a stop for the finger 22 and prevents the situation where the lid 3 can be opened.

Figure 5:
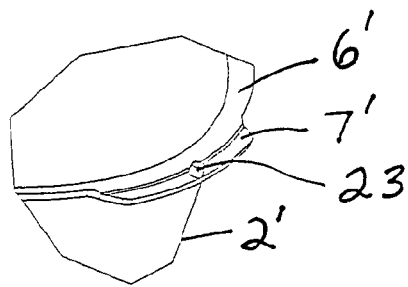
FIG. 5 shows a three-dimensional view of a bayonet.
Figure 6:
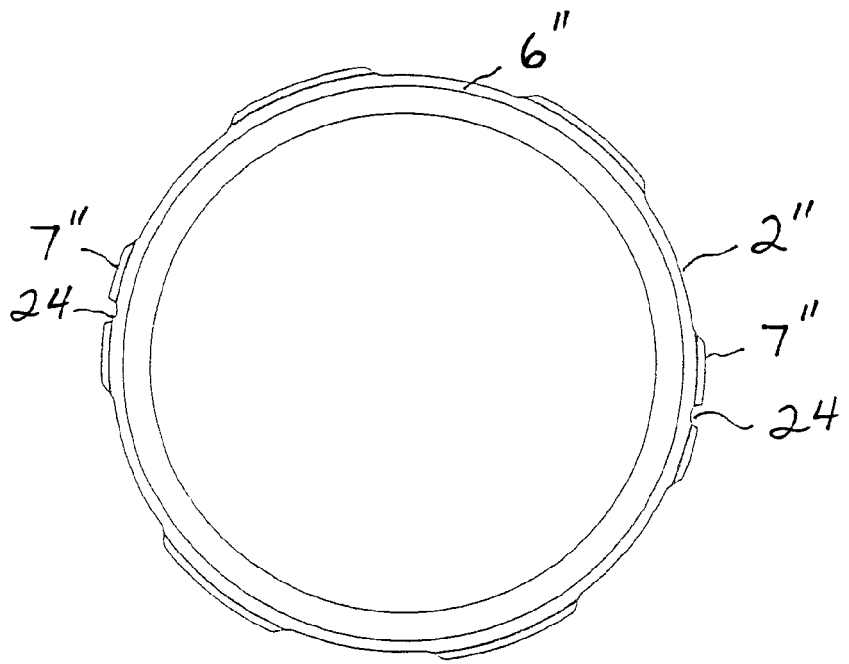
FIG. 6 shows a plan view of a pot with a variant of bayonets.

Instead of the stamped formation 7a, it is also possible, for example according to FIG. 5, for an upwardly projecting pin 23 or protuberance or the like to be arranged on a bayonet 7' on a rim 6' on a pot 2'. If an attempt is made to open the lid 3, then the finger 22 positions itself correspondingly against the pin 23. As an alternative, according to FIG. 6, it is also possible for a pot 2" to have a bayonet 7" with a recess 24 at a rim 6". In the locked position, the finger 22 then engages in this recess 24 and it is thus no longer possible for the lid 3 to be opened. As FIG. 6 shows, preferably at least two bayonets 7" located opposite one another are provided with such a recess 24. The lid 3 can correspondingly be placed on the pot 2" in two positions. More than two symmetrically arranged bayonets 7" are also possible in principle. The lid 3 can then optionally be placed, for example, in three positions. Locking takes place in all three positions, as has been explained above. This also applies, of course, to the bayonets 7 and 7'.

If, once cooking has been completed, the pressure cooker 1 has cooled and the positive pressure has largely dissipated, for example to below 0.04 or 0.05 bar, then the pin 13 is once again located in the position which is shown in FIG. 9. The lid 3 can then readily be rotated into the position which is shown in FIG. 8. The rocker 12a can be pivoted here since the pin 13 no longer prevents the rocker 12a from being pivoted about the spindle 14. The pivoting movement of the rocker 12a causes the finger 22 to be moved radially outward, and it thus disengages from the stamped formation 7a, or the pin 23, or moves out of the recess 24. Since there is no positive pressure present in the interior of the pressure cooker 1, this movement, or the opening of the pressure cooker 1, is safe.

FIGS. 11 to 16 show a locking device 35 which is likewise mounted in a corresponding recess of the pot handle 4. The locking device 35 has a spindle 47 by means of which it is mounted in a pivotable manner in the recess. The spindle 47 is connected, for example according to FIG. 12, to a finger 49 and to an arm 48 such that it can be pivoted via a lever 46. The lever 46 engages with a pin 44 which, according to FIG. 12, butts against the rim 6" by way of a front end on account of the biasing of a spring element 45. The pin 44 is connected in a pivotable manner to the lever 46. The finger 49 corresponds, in terms of functioning, to the finger 22 and the lever 48 corresponds, in terms of functioning, to the arm 16. The pin 44 is mounted in a displaceable manner in the pot handle 4, the spring 45 being supported on the pot handle 4.

Figure 15:
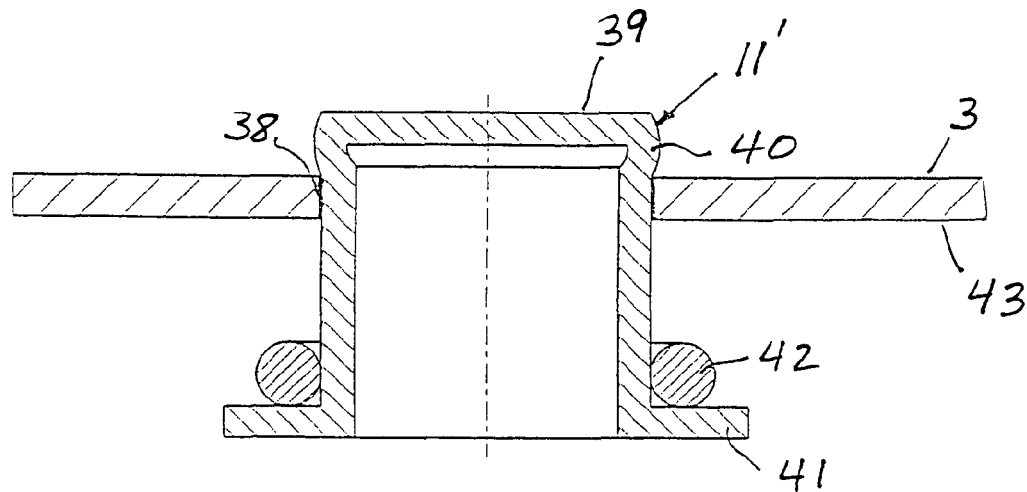
FIG. 15 shows a section through a variant of the pressure element.
Figure 16:
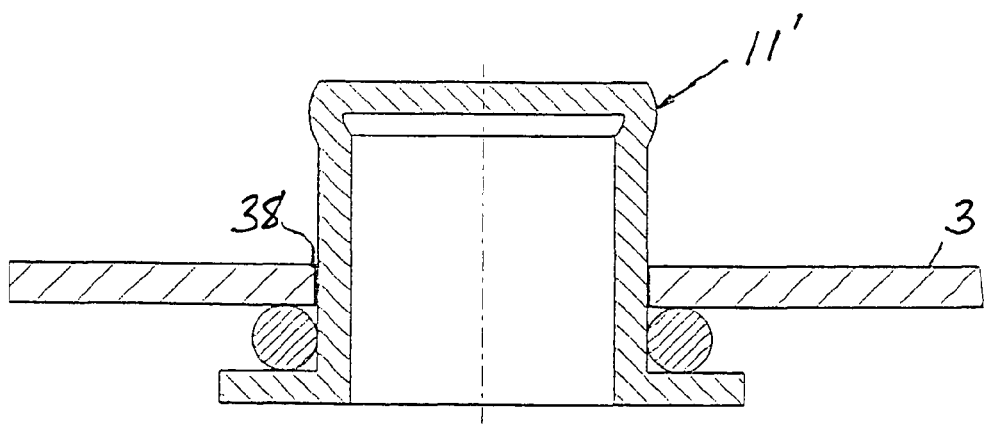
FIG. 16 shows a section through the pressure element in the blocking position.

The locking device 35 interacts with a pressure element 11' which is designed according to FIGS. 15 and 16 and, unlike the pressure element 11, does not perform any safety function. As can be seen from these figures, the pressure element 11' has a sleeve-like body 39 which is mounted in captive and displaceable fashion in an opening 38 of the lid 3'. A sealing ring 42 is arranged between the inside 43 of the lid 3' and a collar 41. A thickened portion 40 is spaced apart from the collar 41 and fixes the pressure element 11' in the lid 3. In the presence of a positive pressure in the pressure cooker, the pressure element 11' moves into the position which is shown in FIG. 16 and in which, as can be seen, the pressure element 11' projects on the top side of the lid 3. It is also possible, however, for the pressure element 11' provided in this embodiment to be replaced by the pressure element 11 which is shown in FIGS. 9 and 10.

Figure 11:
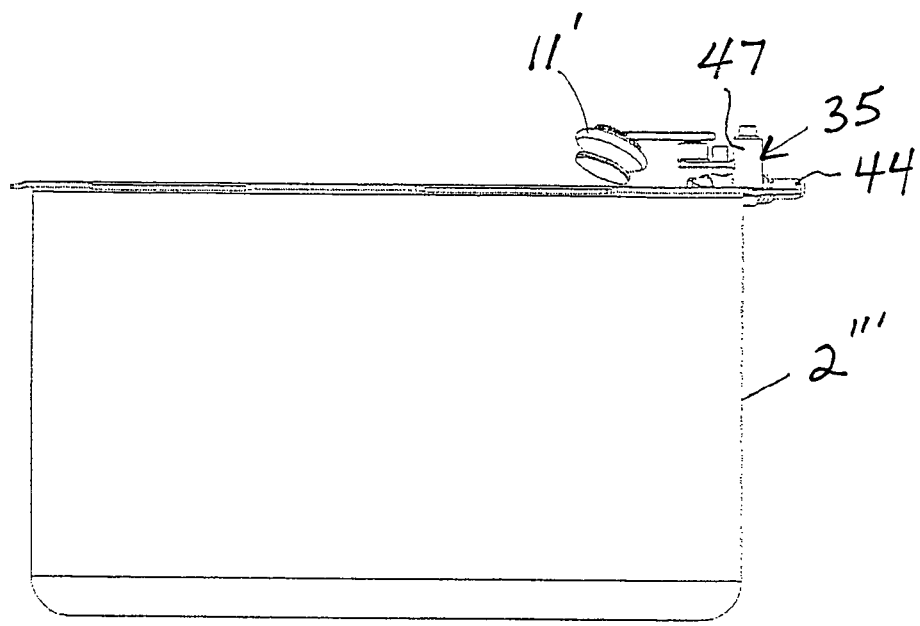
FIG. 11 shows a schematic view of a variant of a pressure cooker, parts having been left out for illustrative reasons.
Figure 12:
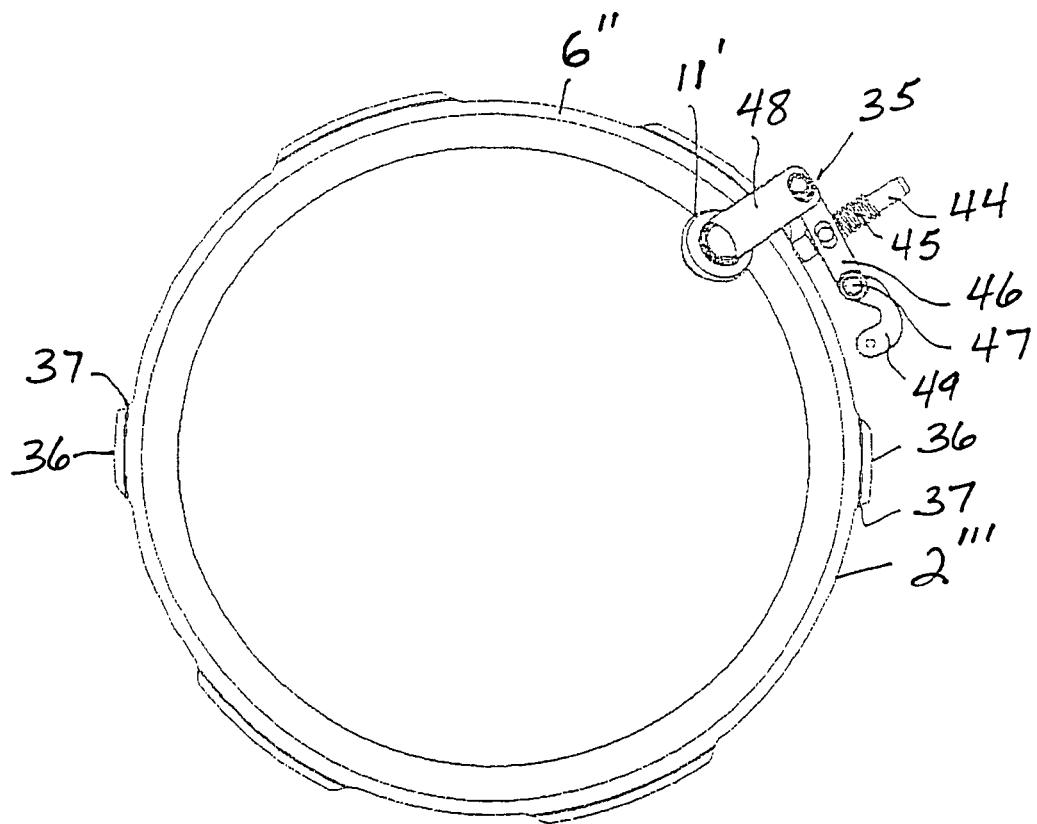
FIG. 12 shows a plan view of the pressure cooker according to FIG. 11.

FIGS. 11 and 12 show the locking device 35 in the unlocked state, in which the lid 3 can thus be rotated. The pressure element 11' is located in the position which is shown in FIG. 15.

Figure 13:
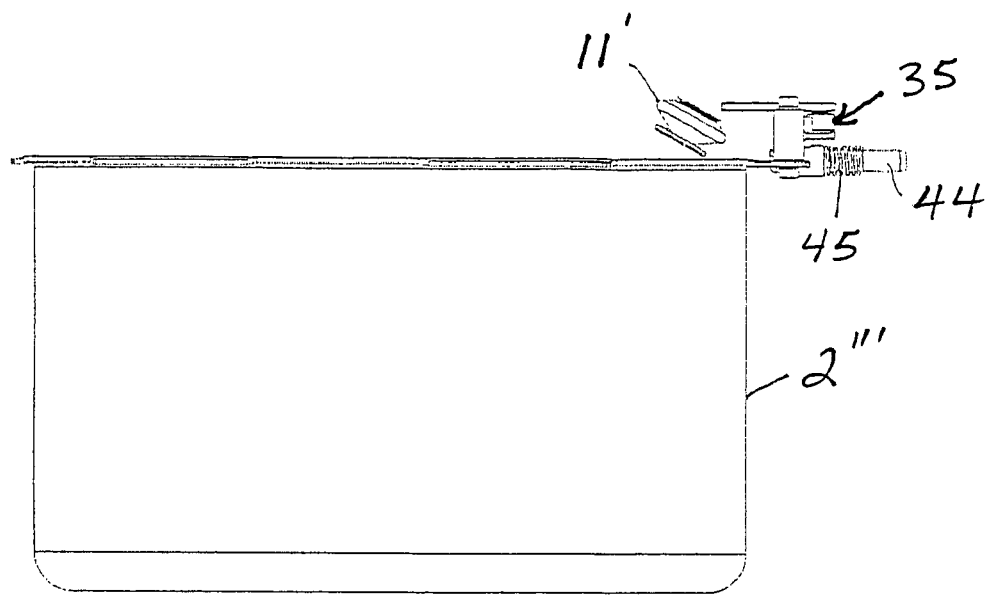
FIG. 13 shows a further view of the pressure cooker according to FIG. 11.
Figure 14:
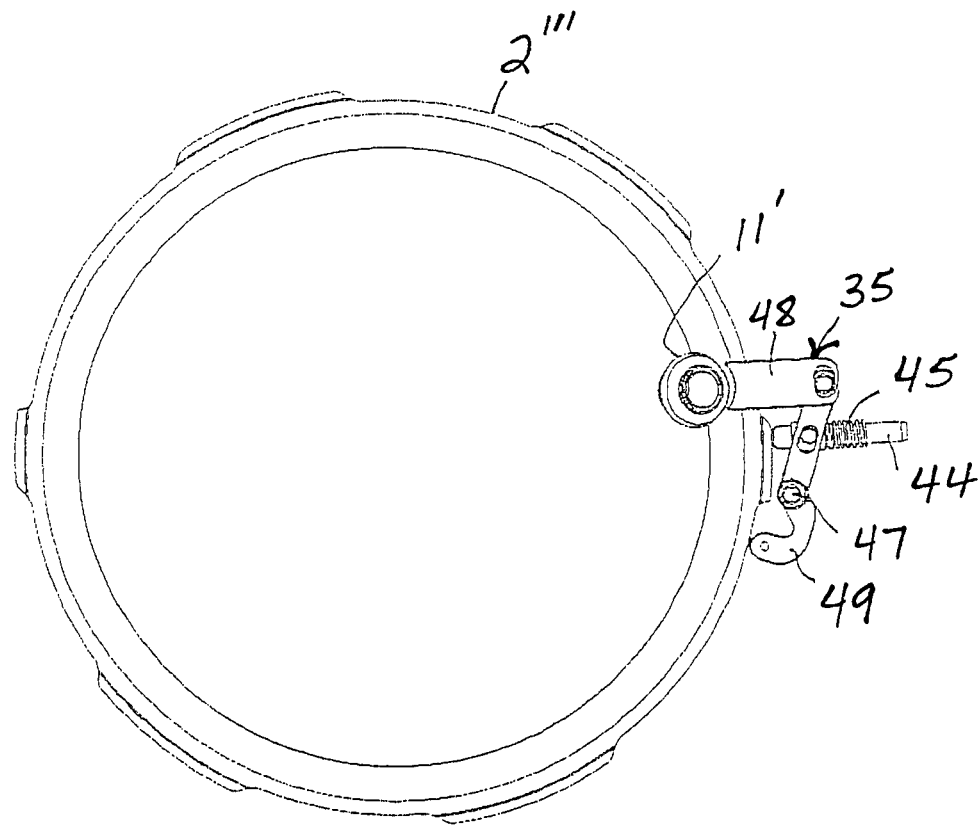
FIG. 14 shows a further view of the pressure cooker according to FIG. 11, in which the pressure cooker has been locked.

FIGS. 13 and 14 show the locking device 35 in the locked state. With the lid 3 located in the closed position and the pressure element 11' located in the position which is shown in FIG. 16, the body 39 projects upward. The pin 44 is biased counter to the spring 45 and butts against a bayonet 36 on the pot 2'''. The bayonet 36 forces the pin 44 into a position in which it is arranged further outward in the radial direction than in the unlocked position, which is shown in FIG. 12. On account of the position of the lever 46, the finger 49 is located further inward in the radial direction in the position which is shown in FIG. 14. If an attempt is then made to open the lid 3, the arm 48 engages with the projecting pressure element 11'. The finger 49 thus cannot be rotated into the position which is shown in FIG. 12. It remains essentially in the position which is shown in FIG. 14 and, ultimately, butts against a shoulder 37 of the bayonet 36. It is thus not possible for the lid 3 to be rotated any further or, consequently, opened.

The bayonet 36 is, as can be seen, of shortened form here. It is also conceivable, however, to have an embodiment in which the finger 49 is positioned against a shoulder of a non-shortened bayonet. A hitherto conventional pot can thus be used with this embodiment.

LIST OF DESIGNATIONS

1 Pressure cooker
2 Pot
3 Lid
4 Pot handle
5 Lid handle
6 Rim
7 Bayonet
8 Bayonet
9 Wall
10 Outside
11 Pressure element
12 Locking device
12a Rocker
13 Pin
14 Spindle
15 Journal
16 Arm 17 Recess
18 Protuberance
19 Protuberance
20 Crosspiece
21 Wall
22 Finger
23 Pin
24 Recess
25 Stamped formation
26 Recess
27 Spring element
28 Handle
29 Housing
30 Recess
31 Bore
32 Collar
33 Screen
34 Groove
35 Locking device
36 Bayonet
37 Shoulder
38 Opening
39 Body
40 Thickened portion
41 Collar
42 Sealing ring
43 Inside
44 Pin
45 Spring element
46 Lever
47 Spindle
48 Arm
49 Finger

The invention claimed is:

1. A pressure cooker which has a pot with a base and a side wall and an upper rim, having a lid which can be connected to the pot in a sealed manner along the abovementioned upper rim and having a locking device which, in the presence of a predetermined positive pressure, connects the lid to the pot in a non-releasable manner in conjunction with a pressure element arranged on the lid, wherein the locking device, in a fitting of the lid, has a rocker which is mounted in a movable manner and, for control purposes and in order to lock the lid, interacts with the pot and the abovementioned pressure element, the lid rotatable relative to the pot, the upper rim contoured to cause the rocker to move so as to cause the locking device to lock the lid as the lid is rotated relative to the pot.

2. The pressure cooker as claimed in claim 1, wherein the contour is formed by at least one bayonet.

3. The pressure cooker as claimed in claim 1, wherein, for the purpose of locking the lid, the rim has a recess, stamped formation or a projecting part which interacts with the rocker.

4. The pressure cooker as claimed in claim 3, wherein the recess, the stamped formation or the projecting part is arranged on a bayonet.

5. The pressure cooker as claimed in claim 1, wherein the rocker is mounted in an essentially concealed recess of a handle on the lid.

6. The pressure cooker as claimed in claim 1, wherein the lid has a handle and the rocker has a spindle by which it is mounted on the lid handle such that it can be pivoted to a limited extent.

7. The pressure cooker as claimed in claim 1, wherein the rocker has an arm which, in the locked position, is stop-blocked by a movable part of the pressure element.

8. The pressure cooker as claimed in claim 1, wherein the rocker has a finger which, for the purpose of controlling the rocker when the lid is rotated, follows along a contour of the pot.

9. The pressure cooker as claimed in claim 8, wherein, in the locked position, the finger engages with a bayonet.

10. The pressure cooker as claimed in claim 9, wherein the bayonet has a recess, a stamped formation or a projecting part with which the finger, in the locked position, engages.

11. The pressure cooker as claimed in claim 1, wherein the rocker is in one piece.

12. The pressure cooker as claimed in claim 1, wherein the rim of the pot has two or more than two symmetrically arranged bayonets which can interact with the locking device.

13. The pressure cooker as claimed in claim 1, wherein a sealing ring is mounted in the interior of the lid and the rocker deforms this ring if the lid is not in the closed position and it is not possible for any pressure to build up in the interior of the pressure cooker.

14. The pressure cooker as claimed in claim 1 wherein the rocker interacts directly with the upper rim so that the rocker moves in response to rotation of the lid relative to the pot to thereby cause the locking device to lock the lid.

15. A pressure cooker which has a pot with a base and a side wall and an upper rim, having a lid which can be connected to the pot in a sealed manner along the abovementioned upper rim and having a locking device which, in the presence of a predetermined positive pressure, connects the lid to the pot in a non-releasable manner in conjunction with a pressure element arranged on the lid, wherein the locking device, in a fitting of the lid, has a rocker which is mounted in a movable manner and, for control purposes and in order to lock the lid, interacts with the pot and the abovementioned pressure element, wherein the rocker has a finger which, for the purpose of controlling the rocker when the lid is rotated, follows along a contour of the pot, wherein, in a locked position, the finger engages with a bayonet, wherein the bayonet has a recess, a stamped formation or a projecting part with which the finger, in the locked position, engages.

16. The pressure cooker as claimed in claim 15 wherein the rocker interacts directly with the pot and is caused to move in response to turning of the lid relative to the pot.

17. The pressure cooker as claimed in claim 15 wherein the rocker is moved by pivoting as the lid is turned relative to the pot to lock the lid.

* * * * *